US006806985B1

(12) United States Patent
Devenyi

(10) Patent No.: US 6,806,985 B1
(45) Date of Patent: Oct. 19, 2004

(54) OPTICAL SYSTEM WITH SHUTTER ASSEMBLY HAVING AN INTEGRAL SHUTTER-MOUNTED ACTUATOR

(75) Inventor: Gabor Devenyi, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/373,230

(22) Filed: Feb. 24, 2003

(51) Int. Cl.⁷ .............................................. G02B 26/02
(52) U.S. Cl. ...................... 359/230; 359/234; 396/457
(58) Field of Search ................................ 359/227, 230, 359/232–236; 396/355, 452, 455–471, 493–496

(56) References Cited

U.S. PATENT DOCUMENTS

| 5,955,806 A | | 9/1999 | Devenyi | |
|---|---|---|---|---|
| 6,033,131 A | * | 3/2000 | Ghosh et al. | 396/452 |
| 6,323,575 B1 | | 11/2001 | Devenyi | |

* cited by examiner

*Primary Examiner*—James Phan
(74) *Attorney, Agent, or Firm*—Karl A. Vick; William C. Schubert

(57) ABSTRACT

An optical system includes a shutter assembly with a stationary support, a shutter pivotably mounted upon and movable with respect to the support; and a shutter drive mechanism. The shutter drive mechanism includes a permanent first magnet affixed to the shutter, and a first electromagnet structure affixed to the support facing a first side of the shutter and including a first-structure first electromagnet. The permanent first magnet and the first-structure first electromagnet are positioned such that activation of the first-structure first electromagnet causes the permanent first magnet to move relative to the first-structure first electromagnet. The shutter drive mechanism further includes a second electromagnet structure affixed to the support facing a second side of the shutter and including a second-structure first electromagnet. The permanent first magnet and the second-structure first electromagnet are positioned such that activation of the second-structure first electromagnet causes the permanent first magnet to move relative to the second-structure first electromagnet in a same direction as the activation of the first-structure first electromagnet.

20 Claims, 3 Drawing Sheets

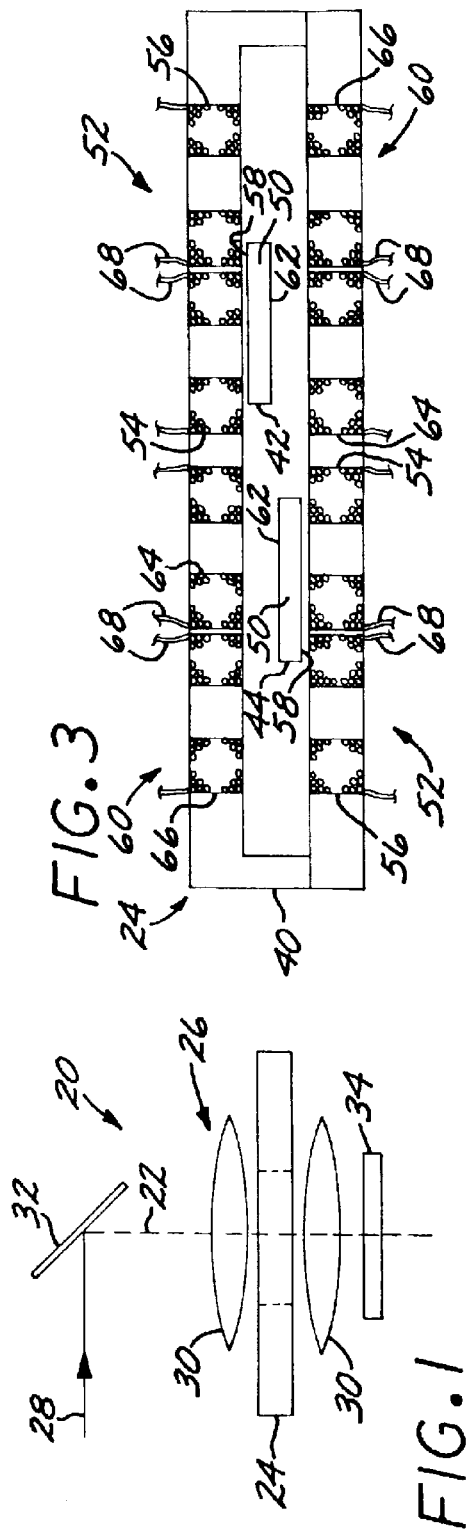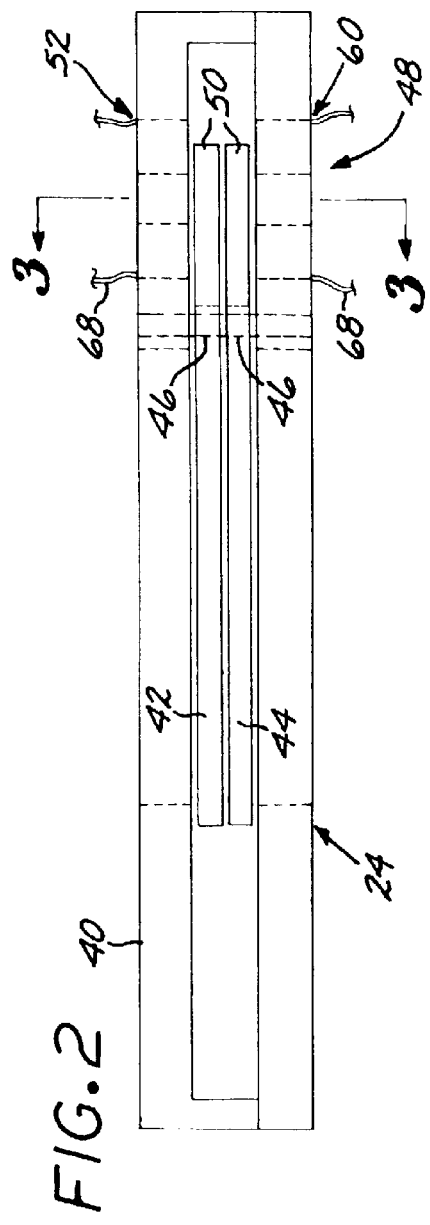

OPTICAL SYSTEM WITH SHUTTER ASSEMBLY HAVING AN INTEGRAL SHUTTER-MOUNTED ACTUATOR

The present invention relates to an optical system having a shutter assembly therein and, more particularly, to the shutter assembly wherein the shutter drive mechanism is integral with and mounted on the movable shutter.

BACKGROUND OF THE INVENTION

Some optical systems include a shutter assembly with a shutter that controllably blocks and unblocks the optical path. The shutter assembly usually includes a shutter electromechanical drive and a shutter mechanical drive extending from the shutter electromechanical drive to the shutter. The shutter electromechanical drive may include a solenoid, a DC motor, a stepper motor, or the like for generating a controllable movement. The shutter mechanical drive usually includes a mechanical linkage, levers, gears, or the like, for transmitting the mechanical movement of the shutter electromechanical drive to the shutter.

In a typical configuration, the shutter is pivotably mounted to its support, and the shutter electromechanical drive is mounted close to, but not integral with, the shutter. The shutter mechanical drive extends from the shutter electromechanical drive to a location laterally separated from the pivot point. A movement produced by the shutter electromechanical drive, and transmitted to the shutter by the shutter mechanical drive, causes the shutter to pivot between an open position wherein the optical path is not blocked, and a closed position wherein the optical path is blocked.

This approach is operable and widely used, but it has limitations in certain applications. The shutter assembly is often placed between two other optical elements, such as between two lenses or between a lens and another optical device. When the optical system is miniaturized, it is difficult to miniaturize the shutter assembly with its shutter electromechanical drive and its shutter mechanical drive proportionately. The miniaturized shutter assembly therefore is still relatively thick, bulky, and heavy. Additionally, the shutter mechanical drive may have backlash and a considerable inertia, so that its movement is not as precise or as rapid as might be desired.

There is a need for an improved approach to the shutter assembly used in optical systems and otherwise. The need is particularly acute for miniaturized shutter assemblies used with physically small optical systems. The present invention fulfills this need, and further provides related advantages.

SUMMARY OF THE INVENTION

The present approach provides an optical system with a shutter drive mechanism that is integral with the shutter assembly. There is no separate shutter electromechanical drive, and therefore no shutter mechanical drive extending from the shutter electromechanical drive to the shutter. The present shutter assembly is therefore smaller, thinner, and lighter than conventional shutter assemblies. It may also be miniaturized much more readily than the conventional shutter with its drives.

In accordance with the invention, an optical system comprises a shutter assembly, which includes a support, a shutter movable with respect to the support, and a shutter drive mechanism. The shutter drive mechanism includes a first magnet affixed to a first one of the support and the shutter, and a first electromagnet structure affixed to a second one of the support and the shutter and comprising a first-structure first electromagnet. The first magnet and the first-structure first electromagnet are positioned such that activation of the first-structure first electromagnet causes the first magnet to move relative to the first-structure first electromagnet. Accordingly, the shutter, which is typically movable, moves relative to the support, which is typically stationary.

The optical system desirably has an optical path, and the shutter assembly is operable to controllably block and unblock the optical path. By properly locating the first magnet and the first-structure first electromagnet, the shutter may be made to move between a desired open position and a desired closed position. In most cases, the optical system further includes an optical element that interacts with a light beam traveling along the optical path.

It is preferred that the first magnet be a permanent magnet, and that the permanent first magnet be affixed to the movable shutter. The mass of the shutter and its affixed permanent magnet is thereby kept to a minimum, and there are no electrical wires leading to the shutter. The first electromagnet is affixed to the stationary support. In a convenient arrangement, the shutter is pivotably mounted to the support.

The shutter is usually designed either to be normally open or normally closed. To aid in retaining the shutter in the normally open or normally closed position in the absence of any current flow through the first electromagnet, there may be provided a bias structure operable to bias the shutter toward a first position, and the activation of the first electromagnet structure moves the shutter to a second position. The bias may be a spring or another magnet that provides the biasing force. In one embodiment, the core of the first electromagnet may be made of a rod of a soft magnetic material such as a magnetized low-carbon steel. The core acts as a biasing magnet to bias the shutter toward the position of the first electromagnet.

In another approach, the first electromagnet structure may further include a first-structure second electromagnet, wherein the first magnet and the first-structure second electromagnet are positioned such that activation of the first-structure first electromagnet and the first-structure second electromagnet both cause the first magnet to move in the same direction relative to the first-structure first electromagnet. In the usual case, the first-structure first electromagnet and the first-structure second electromagnet are electrically wired such that, upon activation, one attracts the first magnet and the other repels the first magnet. The polarity of the electromagnets may be reversed to cause the first magnet, and thence the shutter structure to which it is attached, to move in the opposite direction.

In its preferred form where it is on the stationary support, the first electromagnet structure lies on one side of the shutter. There may be provided a second electromagnet structure, having a structure like that of the first electromagnet structure, but fixed to the support on the opposite side of the shutter. The two electromagnet structures are arranged to force the shutter to move in the same direction. The result is increased magnetic force applied to the shutter.

Thus, an optical system comprises a preferred shutter assembly including a stationary support, a shutter pivotably mounted upon and movable with respect to the support, and a shutter drive mechanism. The shutter drive mechanism includes a permanent first magnet affixed to the shutter, and a first electromagnet structure affixed to the support facing a first side of the shutter and comprising a first-structure first electromagnet. The permanent first magnet and the first-structure first electromagnet are positioned such that activation of the first-structure first electromagnet causes the permanent first magnet to move relative to the first-structure first electromagnet. The shutter drive mechanism also includes a second electromagnet structure affixed to the support facing a second side of the shutter and comprising a second-structure first electromagnet. The permanent first magnet and the second-structure first electromagnet are positioned such that activation of the second-structure first electromagnet causes the permanent first magnet to move relative to the second-structure first electromagnet in a same direction as the activation of the first-structure first electromagnet. Compatible features discussed elsewhere herein may be used with this embodiment as well.

The present approach thus uses the support and the shutter themselves as the movable components that drive the opening and closing action of the shutter, rather than using a separate shutter electromechanical drive and a shutter mechanical drive. Size, mass, inertia, and potential problems such as backlash are thereby avoided. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic depiction of an optical system using the present shutter assembly;

FIG. 2 is an enlarged schematic sectional view of the shutter assembly;

FIG. 3 is a schematic sectional view of the shutter assembly, taken on line 3—3 of FIG. 2;

DETAILED DESCRIPTION OF THE INVENTION

Figure 4:
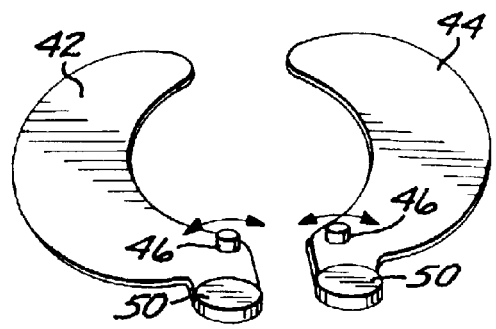
FIG. 4 is a schematic perspective view of the shutters in isolation.

FIG. 1 depicts an optical system 20 having an optical path 22 therethrough. The optical system includes a shutter assembly 24 which controllably blocks or unblocks the optical path 22. The optical system 22 includes optical elements 26 that interact with a light beam 28 traveling along the optical path 22. In the illustration, the optical elements 26 include lenses 30, a mirror 32, and a detector 34, but these optical elements are exemplary. The present shutter assembly 24 may be used with any operable optical system 20.

Figure 5:
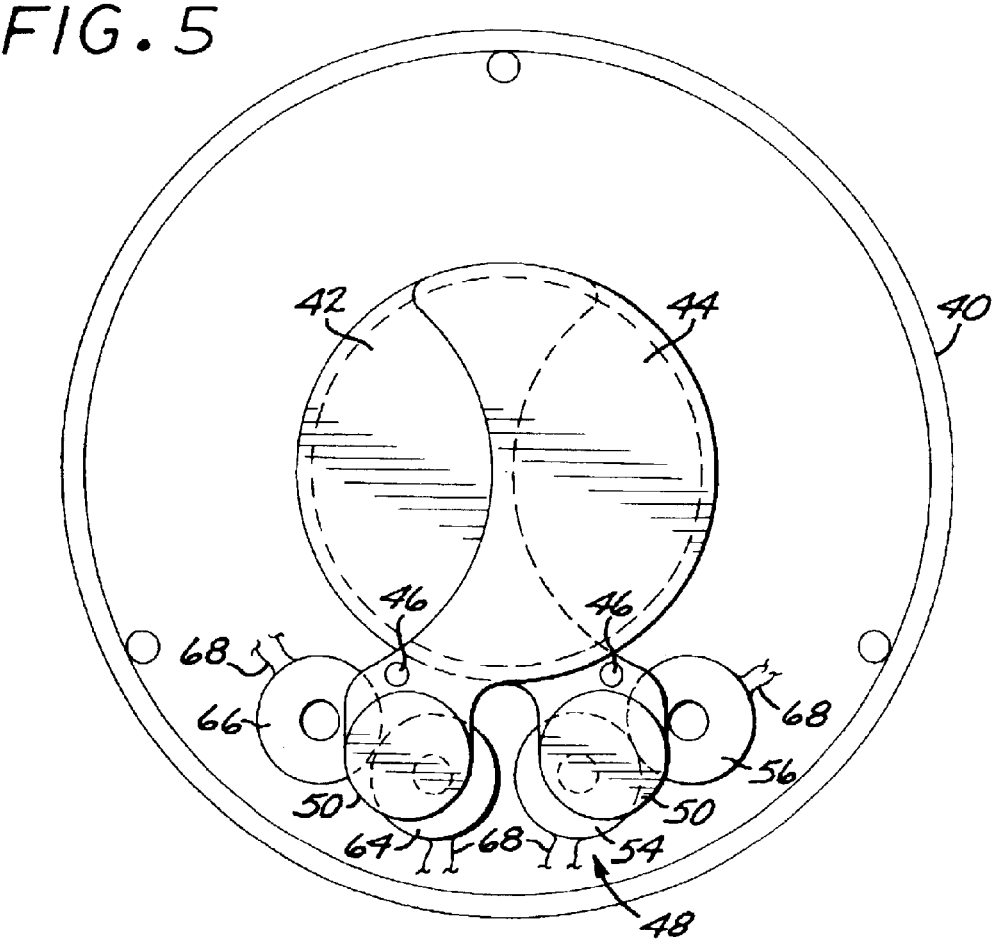
FIG. 5 is a schematic internal elevational view including the shutters and the magnets.

FIGS. 2–3 show the shutter assembly 24 in greater detail. FIG. 4 shows the shutters 42 and 44 in isolation, and FIG. 5 shows the shutters 42 and 44 mounted in the support 40.

As seen in these views, the shutter assembly 24 includes a support 40 and at least one shutter 42, in this case two shutters 42 and 44, movable with respect to the support 40. In the illustrated embodiment, the support 40 is a housing that is stationary and fixed, and the shutters 42 and 44 are pivotably supported from the support 40 and pivotably movable with respect to the support 40 on respective pivot pins 46.

A shutter drive mechanism 48 includes a respective first magnet 50 affixed to a first one of the support 40 and the shutters 42 and 44. In the preferred approach which is depicted and will be described in detail, the first magnet 50 is permanent first magnet, and there is a respective first magnet 50 affixed to each of the shutters 42 and 44. Where there are two shutters 42 and 44, there is a separate first magnet 50 for each of the shutters 42 and 44. The first magnet 50 could be an electromagnet, but that would require that electrical leads extend to the movable shutters 42 and 44 and consequently is riot preferred.

A first electromagnet structure 52 is affixed to the other of the support 40 and the shutter 42. In the illustrated and preferred case, the first electromagnet structure 52 is affixed to the support 40. Where there are two shutters 42 and 44, as illustrated, there is a respective first electromagnet structure 52 affixed to the support 40 for each of the shutters 42 and 44. The first electromagnet structure 52 includes a first-structure first electromagnet 54. The first magnet 50 and the first-structure first electromagnet 54 are positioned such that activation of the first-structure first electromagnet 54 causes the first magnet 50, and the respective shutter 42 or 44 to which the first magnet 50 is affixed, to move relative to the first-structure first electromagnet 54, and thence relative to the support 40. Optionally but preferably, the first electromagnetic structure 52 also has a first-structure second electromagnet 56. The first magnet 50 and the first-structure second electromagnet 56 are positioned and electrically wired such that activation of the first-structure first electromagnet 54 and the first-structure second electromagnet 56 both cause the first magnet 50 to move in the same direction relative to the first-structure first electromagnet 54. The respective shutters 42 and 44 are thereby moved between open and closed positions.

In the embodiment of FIGS. 2–3, the first electromagnet structure 52 is affixed to one side of the support 40, in facing relation to a first side 58 of the respective shutter 42 or 44. There may additionally be a second electromagnet structure 60 affixed to the support 40 facing a second side 62 of the respective shutter 42 or 44. The use of the second electromagnet structure 60 increases the driving force on the shutters 42 and 44, and also balances the forces applied to the first magnet 50 and thence to the respective shutters 42 and 44 to avoid torques that would otherwise have to be reacted through the pivot pin 46. The second electromagnet structure 60 is structured similarly to the first electromagnet structure 52. The second electromagnet structure 60 has a second-structure first electromagnet 64. The first magnet 50 and the second-structure first electromagnet 64 are positioned and activated such that activation of the second-structure first electromagnet 64 causes the first magnet 50 to move relative to the second-structure first electromagnet 64 in a same direction as does the activation of the first-structure first electromagnet 54. The second electromagnet structure 60 also preferably includes a second-structure second electromagnet 66. The first magnet 50 and the second-structure second electromagnet 66 are positioned and electrically wired such that activation of the second-structure second electromagnet 66 causes the first magnet 50 to move relative to the second-structure second electromagnet 66 in a same direction as does the activation of the first-structure second electromagnet 56. The respective shutters 42 and 44 are thereby moved between open and closed positions. Pairs of electrical leads 68 extend from the various electromagnets 54, 56, 64, and 66.

Figure 6:
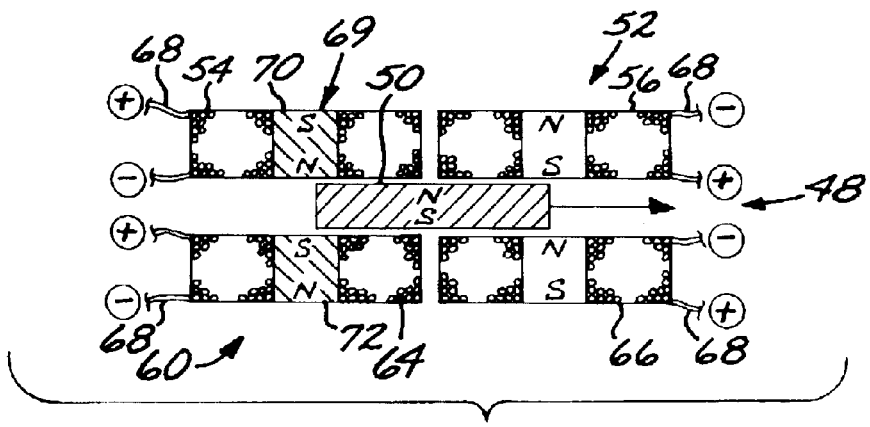
FIG. 6 is a schematic elevational view of the arrangement of the magnets when the electromagnets are activated for movement in a first direction.
Figure 7:
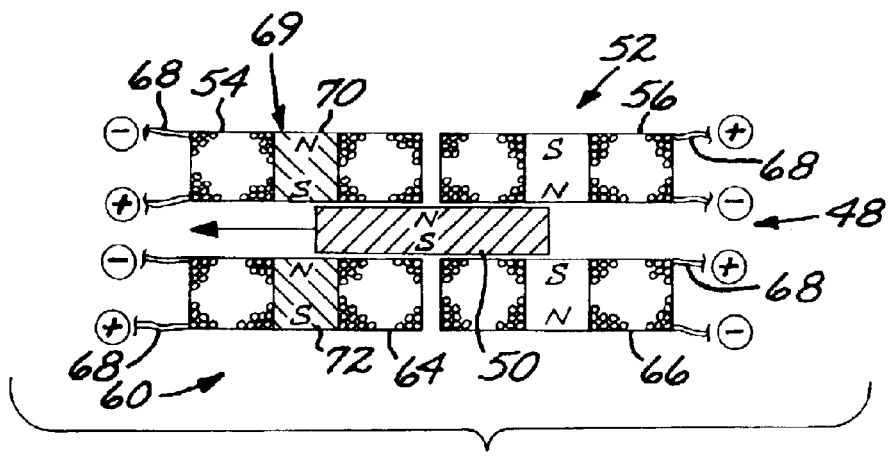
FIG. 7 is a schematic elevational view of the arrangement of the magnets when the electromagnets are activated for movement in a second direction.

FIGS. 6 and 7 illustrate the wiring and activation of the electromagnets 54, 56, 64, and 66. The first-structure first electromagnet 54, the first-structure second electromagnet 56, the second-structure first electromagnet 64, and the second-structure second electromagnet 66 are all electrically wired and activated such that, upon activation, they all drive the first magnet 50, and thence the respective shutter 42 or 44 to which it is affixed, in the same direction. This same drive direction is accomplished by activating the electromagnets 54 and 64 so that their poles repel the first magnet 50 and by activating the electromagnets 56 and 66 so that their poles attract the first magnet 50, to drive the first magnet 50 and its respective shutter to the right in the view of FIG. 6. The excitation of each of the electromagnets 54, 56, 64, and 66 is reversed to drive the first magnet 50 and its respective shutter to the left in the view of FIG. 7.

With this arrangement, the shutters 42 and 44 are positively driven to a first position (i.e., to the right in FIG. 6, which might correspond to the open position of the shutter) or to a second position (i.e., to the left in FIG. 7, which might correspond to the closed Position of the shutter). If the power is turned off to the electromagnets 54, 56, 64, and 66, as in the event of a power failure, the positions of the shutters 42 and 44 mechanically float, and may come to rest anywhere in the range from closed to open. This mode of operation may be preferred for some applications.

It may instead be preferred for some applications that the shutters 42 or 44 be biased toward either the closed position or the open position, or both, so that the shutters return to those positions in the event that the power is removed from the electromagnets 54, 56, 64, and 66. In this biased-shutter case, the action of the electromagnets 54, 56, 64, and 66 overcomes the biasing force to move the shutters 42 and 44 to the other position. Any operable biasing structure 69 may be used to bias the shutters 42 and 44. In one approach shown in FIGS. 6–7, a first-structure iron rod 70 and/or a second-structure iron rod 72 may be positioned to bias the first magnet 50 and thence the respective shutter 42 or 44. In an illustration of such a biasing structure 69 that is used to bias the first magnet 50 to the left in FIGS. 6–7, the first-structure iron rod 70 and the second-structure iron rod 72 may be positioned, as illustrated, at the center of the cores of the first-structure first electromagnet 54 and the second-structure first electromagnet 64. The iron rods 70 and 72 in this case are preferably soft iron cores or rods that fit inside the coils of the respective electromagnets and are preferably the same height as the electromagnets. Thus, the movable first (permanent) magnet 50 is biased toward the location defined by the iron rods 70 and 72. When the power to the electromagnets is removed, the first magnet 50, and the shutter to which it is attached, move to and are held at the location defined by the iron rods 70 and 72. Activation of the electromagnets as described controllably moves the permanent magnet 50 away from this bias or power-off location. The iron rods 70 and 72, when formed as rods positioned as the cores of the respective electromagnets 54 and 64, also enhance the magnetic flux of their respective electromagnets. The use of the iron rods 70 and 72 with both sets of electromagnets (i.e., the electromagnets 56 and 66, as well as the illustrated electromagnets 54 and 64), produces a bi-stable form of the shutters 40 and 42 in which the shutters are held in the closed or open position they are in, when power is removed from the electromagnets. In another, less preferred, approach, the biasing structure 69 may include a spring to bias the shutters 42 and 44. The use of the spring is not preferred, as it is cumbersome and limits the ability to reduce the width of the shutter assembly 24.

The present approach has been demonstrated with a prototype.

The present shutter assembly has important advantages over the conventional shutter drive that uses a shutter electromechanical drive and a shutter mechanical drive extending from the shutter electromechanical drive to the shutter. The present shutter assembly may be made thinner and thence more compact and lighter in weight, than the conventional approach. It also may be more readily scaled in size. As the size is reduced, the magnets 50, 54, 56, 64, and 66 are made smaller, because the shutters 42 and 44 are made smaller and have less mass to move. There is no concern with achieving and maintaining the mechanical alignment of the shutter electromechanical drive and the shutter mechanical drive as required in the conventional approach. The present approach is also more mechanically efficient than the prior approach.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system comprising a shutter assembly including
 a support;
 a shutter movable with respect to the support; and
 a shutter drive mechanism including
  a first magnet affixed to a first one of the support and the shutter,
  a first electromagnet structure affixed to a second one of the support and the shutter and comprising a first-structure first electromagnet, wherein the first magnet and the first-structure first electromagnet are positioned such that activation of the first-structure first electromagnet causes the first magnet to move relative to the first-structure first electromagnets; and
  a second electromagnets structure.

2. The optical system of claim 1, wherein the sport is stationary and the shutter is movable.

3. The optical system of claim 1, wherein the first magnet is a permanent magnet.

4. The optical system of claim 1, wherein the first magnet is a permanent get affixed to the shutter, and the first electromagnet structure is affixed to the support.

5. The optical system of claim 1, wherein the shutter is pivotably mounted to the support.

6. The optical system of claim 1, where the shutter assembly
 a bias structure operable to bias the shutter toward a first position, and wherein the activation of the first electromagnet structure moves the shutter to a second position.

7. The optical system of claim 1, wherein the optical system has an optical path, wherein the shutter assembly is operable to controllably block and unblock the optical path, and wherein the optical system further includes
 an optical element that interacts with a light beam traveling along the optical path.

8. An optical system comprising a shutter assembly including
 a support;
 a shutter movable with respect to the support; and
 a shutter drive mechanism including
  a first magnet affixed to a first one of the support and the shutter, and
  a first electromagnet structure affixed to a second one of the support and the shutter and comprising a first-structure first electromagnet wherein the first magnet and the first-structure first electromagnet are positioned such that activation of the first-structure first electromagnet causes the first magnet to move relative to the first-structure first electromagnet, wherein the first electromagnet structure further includes a first-structure second electromagnet, wherein the first magnet and the first-structure second electromagnet are positioned such that activation of the first-structure first electromagnet and the first-structure second electromagnet both cause the first magnet to move in the same direction relative to the first-structure first electromagnet.

9. The optical system of claim 8, wherein the first-structure first electromagnet and the first-structure second electromagnet are electrically wire such that, upon activation, a first one attract the first magnet and a second one repels the first magnet.

10. An optical system comprising a shutter assembly including
   a stationary support;
   a shutter pivotably mounted upon and movable with respect to the support; and
   a shutter drive mechanism including
      a permanent first magnet affixed to the shutter,
      a first electromagnet structure affixed to the support facing a first side of the shutter and comprising a first-structure first electromagnet, wherein the permanent first magnet and the first-structure first electromagnet are positioned such that activation of the first-structure first electromagnet causes the permanent first magnet to move relative to the first-structure first electromagnet, and
      a second electromagnet structure affixed to the support facing a second side of the shutter and comprising a second-structure first electromagnet, wherein the permanent first magnet and the second-structure first electromagnet are positioned such that activation of the second-structure first electromagnet causes the permanent first magnet to move relative to the second-structure first electromagnet in a same direction as the activation of the first-structure first electromagnet.

11. The optical system of claim 10, wherein the optical system has an optical path, wherein the shutter assembly is operable to controllably block and unblock the optical path, and wherein the optical system further includes
   an optical element that interacts with a light beam traveling along the optical path.

12. The optical system of claim 10, wherein the first electromagnet structure further includes
   a first-structure second electromagnet, wherein the permanent first magnet and the first-structure second electromagnet are positioned such that activation of the first-structure first electromagnet and the first-structure second electromagnet both cause the permanent first magnet to move in the same direction relative to the first-structure first electromagnet.

13. The optical system of claim 12, wherein the first-structure first electromagnet and the first-structure second electromagnet are electrically wired such that, upon activation, a first one attracts the permanent first magnet and a second one repels the permanent first magnet.

14. The optical system of claim 10, wherein the first electromagnet structure further includes
   a first-structure iron rod operable to bias the permanent first magnet.

15. The optical system of claim 10, wherein the second electromagnet structure further includes
   a second-structure second electromagnet, wherein the permanent first magnet and the second-structure second electromagnet are positioned such that activation of the second-structure first electromagnet and the second-structure second electromagnet both cause the permanent first magnet to move in the same direction relative to the second-structure first electromagnet.

16. The optical system of claim 15, wherein the second-structure first electromagnet and the second-structure second electromagnet are electrically wired such that upon activation, a first one attracts the permanent first magnet and a second one repels the permanent first magnet.

17. An optical system comprising a shutter assembly including
   a stationary support;
   a first shutter pivotably mounted upon and movable with respect to the support; and
   a shutter drive mechanism including
      a permanent first magnet affixed to the first shutter,
      a first electromagnet structure affixed to the support facing a first side of the first shutter and comprising
         a first-structure first electromagnet, wherein the permanent first magnet and the first-structure first electromagnet are positioned such that activation of the first-structure first electromagnet causes the permanent first magnet to move relative to the first-structure first electromagnet, and
         a first-structure second electromagnet, wherein the permanent first magnet and tie first-structure second electromagnet are positioned such that activation of the first-structure first electromagnet and the first-structure second electromagnet both cause the permanent first magnet to move in a same direction relative to the first-structure first electromagnet, and
      a second electromagnet structure affixed to the support facing a second side of the first shutter and comprising
         a second-structure first electromagnet, wherein the permanent first magnet and the second-structure first electromagnet are positioned such that activation of the second-structure first electromagnet causes the permanent first magnet to move relative to the second-structure first electromagnet in the same direction as the activation of the first-structure first electromagnet, and
         a second-structure second electromagnet, wherein the permanent first magnet and the second-structure second electromagnet are positioned such that activation of the second-structure first electromagnet and the second-structure second electromagnet both cause the permanent first magnet to move in the same direction relative to the second-structure first electromagnet, and wherein the second-structure first electromagnet and the second-structure second electromagnet are electrically wired such that, upon activation, a first one attracts the permanent first magnet and a second one repels the permanent first magnet.

18. The optical system of claim 17, wherein the optical system has an optical pat wherein the shutter assembly is operable to controllably block and unlock the optical path, and wherein the optical system further includes
   an optical element that interacts with a fight beam traveling along the optical path.

19. The optical system of claim 17, wherein the first electromagnet structure further includes
a first-structure iron operable to bias the permanent first magnet.

20. The optical system of claim 17, further including a second shutter pivotably connected to the support.

* * * * *